(12) United States Patent
Nihei et al.

(10) Patent No.: US 7,145,100 B2
(45) Date of Patent: Dec. 5, 2006

(54) LASER PROCESSING ROBOT SYSTEM

(75) Inventors: Ryo Nihei, Fujiyoshida (JP); Toshihiko Inoue, Fujiyoshida (JP); Takatoshi Iwayama, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 44 days.

(21) Appl. No.: 11/203,289

(22) Filed: Aug. 15, 2005

(65) Prior Publication Data

US 2006/0037950 A1 Feb. 23, 2006

(30) Foreign Application Priority Data

Aug. 20, 2004 (JP) .............................. 2004-241490

(51) Int. Cl.
*B23K 26/08* (2006.01)
(52) U.S. Cl. ................................. 219/121.78
(58) Field of Classification Search .......... 219/121.78, 219/121.63, 121.84
See application file for complete search history.

(56) References Cited

U.S. PATENT DOCUMENTS

| | | | | |
|---|---|---|---|---|
| 4,578,554 | A | * | 3/1986 | Coulter .................. 219/121.63 |
| 6,369,353 | B1 | | 4/2002 | Soska |
| 2005/0150876 | A1 | * | 7/2005 | Menin et al. .......... 219/121.63 |
| 2005/0211683 | A1 | * | 9/2005 | Deplano ................. 219/121.78 |

FOREIGN PATENT DOCUMENTS

| | | | |
|---|---|---|---|
| EP | 0 428 748 | | 5/1991 |
| JP | 2-84290 | | 3/1990 |
| JP | 5-237684 A | * | 9/1993 |
| JP | 2606011 | | 2/1997 |
| JP | 2003-200376 | | 7/2003 |

OTHER PUBLICATIONS

European Search Report, dated Dec. 7, 2005, for related European Patent Application No. 05017870.6-2316.

* cited by examiner

*Primary Examiner*—Geoffrey S. Evans
(74) *Attorney, Agent, or Firm*—Staas & Halsey LLP

(57) ABSTRACT

A laser processing robot including a manipulator; a laser processing tool attached to the manipulator; an optical fiber for transmitting a laser beam to the laser processing tool; and a line passage formed inside the arm section to accommodate the optical fiber. The arm section includes a first member disposed fixedly about a first control axis and a second member supported on the first member rotatably about the first control axis. The line passage is formed continuously within the first and second members, an optical fiber inlet port thereof being provided in the first member and an optical fiber outlet port thereof being provided in the wrist portion. The laser processing tool includes an attachment section attached to the wrist portion rotatably about a second control axis perpendicular to the first control axis; a nozzle section extending from the attachment section and provided with a laser beam passage.

7 Claims, 3 Drawing Sheets

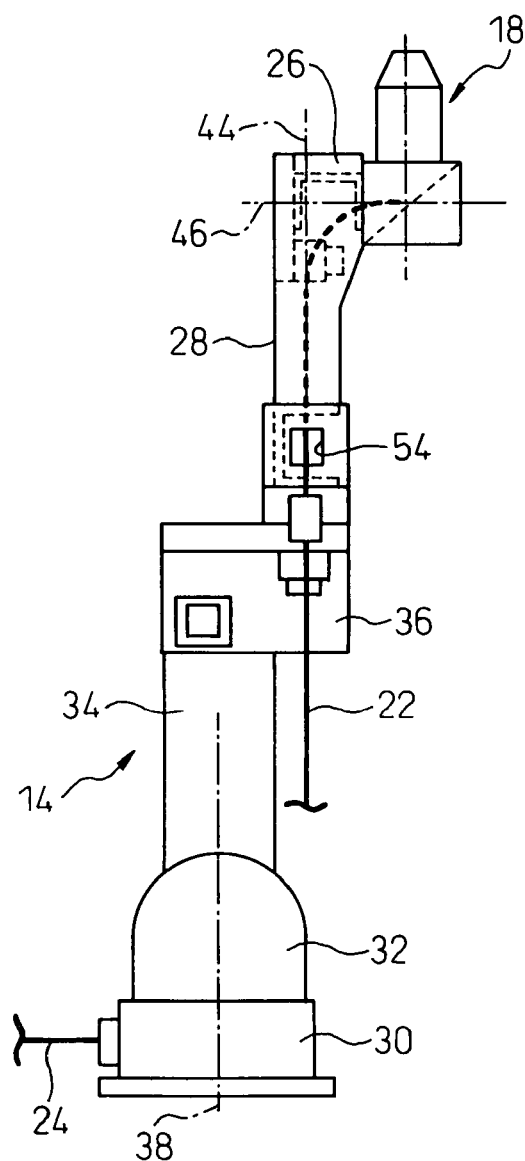
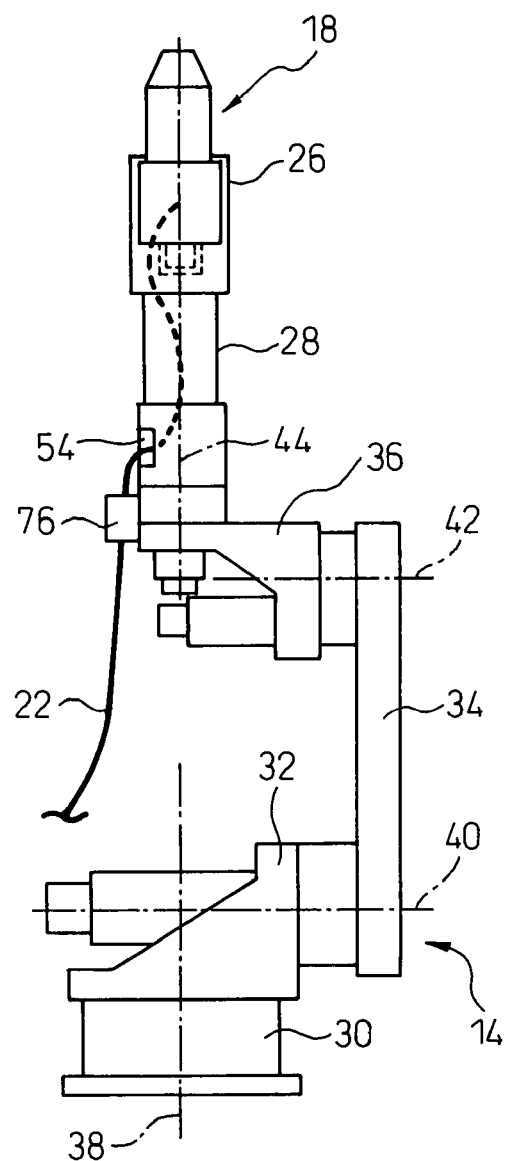

LASER PROCESSING ROBOT SYSTEM

BACKGROUND OF THE INVENTION

1. Field of the Invention

The present invention relates to a laser processing robot. The present invention also relates to a robot system including the laser processing robot.

2. Description of the Related Art

In a laser processing robot system in which an industrial robot carries out a laser processing, it is known that an optical fiber can be used as a transmission path for supplying a laser beam from a laser oscillator to a laser processing tool attached to a wrist portion of a robot mechanical section (referred to as a "manipulator" in this application). In this robot system, the optical fiber generally has a large minimum-allowable radius-of-curvature and is laid outside the manipulator, as an umbilical member in the form of a cable or a containing conduit, so as to have a certain degree of freedom for maintaining a bending radius larger than the minimum-allowable radius-of-curvature. In this arrangement, during a period when the manipulator operates in a laser processing, the laying configuration of the umbilical member considerably varies due to the operation of the manipulator, so that the umbilical member may be excessively pulled to be entangled with the arm section or other peripheral members, or may be excessively loosened to reduce the output power of the laser beam due to a variation in curvature, which may lead to a malfunction in a processing operation.

In order to solve the problems associated with the optical fiber layout in the laser processing robot system, it is conventionally proposed to accommodate the optical fiber (or the umbilical member) within the arm section of the manipulator. For example, Japanese Patent Publication No. 2606011 (JP-B-2606011) discloses that an optical fiber connected to a laser torch attached to a wrist portion at the distal end of an articulated robot is arranged within a hollow portion of a rotation shaft of an arm having the wrist portion to extend along a rotation axis of the shaft. On the other hand, Japanese Unexamined Patent Publication (Kokai) No. 2003-200376 (JP-A-2003-200376) discloses that a cable for supplying power, signal, material, etc. to an end effector attached to a wrist portion of an industrial robot is introduced into an interior of an arm through an inlet port formed at a lateral side of the arm and is drawn out from an opening formed at a position intersecting the axis of a rotation shaft of the wrist portion to extend to the end effector.

In the construction as disclosed in JP-B-2606011, the optical fiber is passed through the hollow portion of the rotation shaft from the rear end of the arm having the wrist portion so as to be introduced into the interior of the arm, and then extends directly to the laser torch at the distal end. The laser torch projects from the wrist portion in a direction perpendicular to the axis of the rotation shaft of the arm, so that the optical fiber extends to be bent or turned at generally 90° at a location just before the laser torch. In this construction, it may be difficult to ensure or maintain the minimum-allowable bending radius of the optical fiber at a bent region just before the laser torch. In this connection, although it is possible to ensure the minimum-allowable bending radius of the optical fiber just before the laser torch by increasing the projecting length of the laser torch from the wrist portion, there may be another problem in this measure such that the outer dimensions of the robot, in particular in the region of the end effector, are increased.

Also, in the construction as disclosed in JP-A-2003-200376, the end effector projects in a direction perpendicular to the axis of the rotation shaft of the wrist portion, so that, in order to maintain the minimum-allowable bending radius of the cable just before the end effector, the wrist portion is formed into a two-branch structure so as to expose a portion of the cable to the outside of the wrist portion. If the cable contains an optical fiber, the exposed portion of the cable may give rise to the above-described problems due to the excessive entanglement or loosening. In this construction, there may also be a problem in that the outer dimensions of the region of the end effector are increased.

SUMMARY OF THE INVENTION

It is an object of the present invention to provide a laser processing robot which can solve the problem of the possible entanglement and/or bending of an optical fiber during a laser processing operation, and thus can effectively suppress an increase in outer dimensions of the robot.

Another object of the present invention is to provide a safe and easily operable robot system including such a superior laser processing robot.

To accomplish the above object, the present invention provides a laser processing robot comprising: a manipulator including an arm section having a wrist portion, the manipulator provided with a plurality of control axes; a laser processing tool attached to the wrist portion of the manipulator; an optical fiber for transmitting a laser beam toward the laser processing tool; and a line passage formed inside the arm section of the manipulator and accommodating the optical fiber; wherein the arm section includes: a first member disposed fixedly relative to a first control axis at a side opposite to the wrist portion; and a second member supported on the first member and rotatable about the first control axis, the second member provided at a distal end thereof with the wrist portion; the line passage being formed continuously within the first member and the second member, an optical fiber inlet port of the line passage being provided in the first member and an optical fiber outlet port of the line passage being provided in the wrist portion of the second member; wherein the laser processing tool includes: an attachment section adapted to be attached to the wrist portion and rotatable about a second control axis perpendicular to the first control axis; a nozzle section extending from the attachment section and provided with a laser beam passage extending in a direction intersecting an axial line of the second control axis; and a reflecting section arranged within the attachment section for reflecting a laser beam emitted from the optical fiber and directing the laser beam toward the laser beam passage; and wherein an emitting end face of the optical fiber is positioned between the optical fiber outlet port provided in the wrist portion and the reflecting section of the laser processing tool.

In the above-described laser processing robot, the emitting end face of the optical fiber may be positioned on the axial line of the second control axis; and an optical axis of the laser beam emitted from the emitting end face may coincide with the axial line of the second control axis.

Also, the reflecting section of the laser processing tool may define, within the laser beam passage of the nozzle section, an optical axis of the laser beam, generally perpendicular to the axial line of the second control axis, at a position spaced from an axial line of the first control axis.

The above-described laser processing robot may further comprise an electric motor for pivoting the laser processing tool about the second control axis, and the electric motor may be housed in an interior of the second member of the arm section.

The present invention also provides a robot system comprising the above-described laser processing robot and a laser oscillator connected to the optical fiber of the laser processing robot.

BRIEF DESCRIPTION OF THE DRAWINGS

The above and other objects, features and advantages of the present invention will become more apparent from the following description of preferred embodiments in connection with the accompanying drawings, wherein:

FIG. 2A is a front view of a laser processing robot according to an embodiment of the present invention;

FIG. 2B is a side view of the laser processing robot of FIG. 2A; and

DETAILED DESCRIPTION

Figure 1:
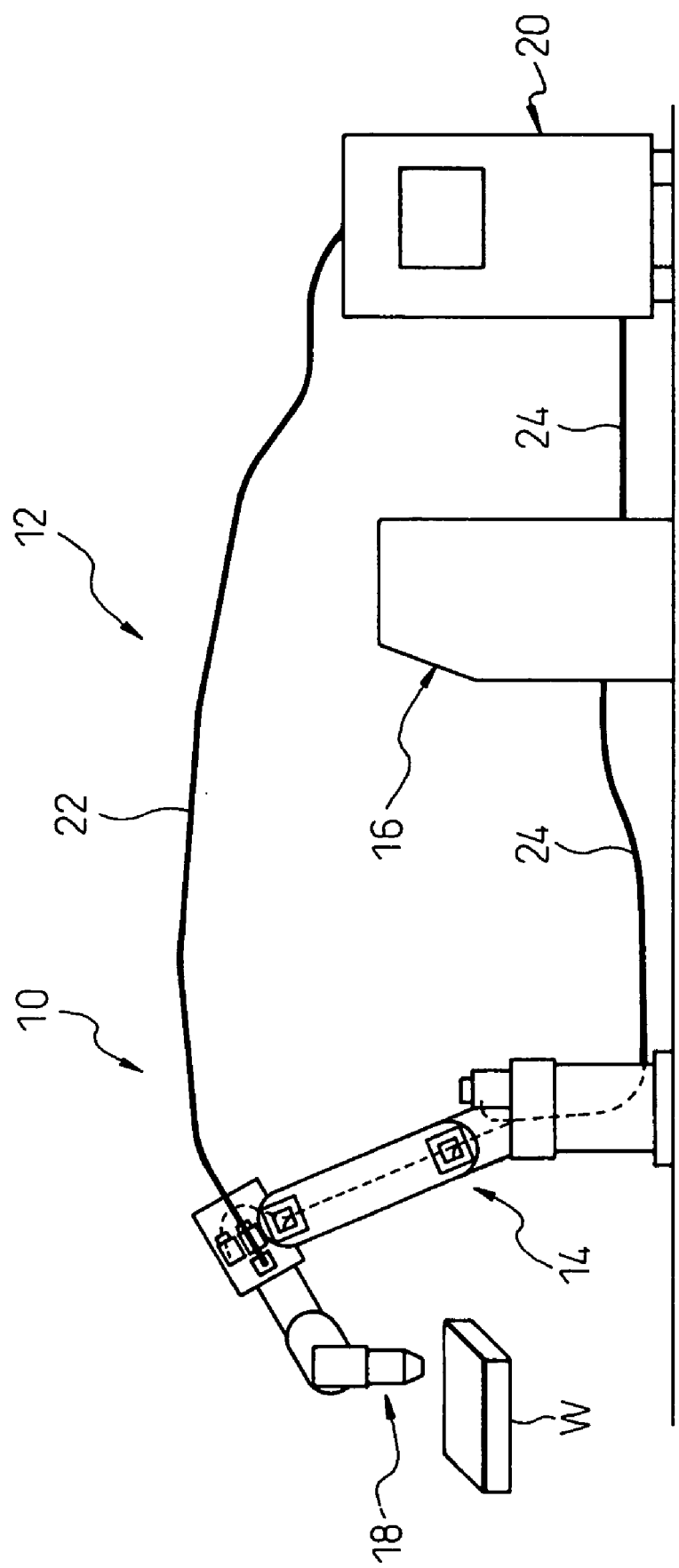
FIG. 1 is a schematic view showing a basic configuration of a laser processing robot system according to the present invention.

The embodiments of the present invention are described below in detail, with reference to the accompanying drawings. In the drawings, the same or similar components are denoted by common reference numerals.

Referring to the drawings, FIG. 1 schematically shows the basic configuration of a laser processing robot 10 and a robot system 12, according to the present invention. The laser processing robot 10 includes a manipulator (or a robot mechanical section) 14 provided with a plurality of control axes, a controller 16 for controlling the operation of the manipulator 14, and a laser processing tool 18 attached to the distal end of the manipulator 14 to act as an end effector. The robot system 12 is composed by adding a laser oscillator 20 to the laser processing robot 10.

Between the laser processing robot 10 and the laser oscillator 20, an optical fiber 22 is laid or provided for transmitting a laser beam generated from the laser oscillator 20 to the laser processing tool 18. The controller 16 is connected through control lines 24 to the manipulator 14 and the laser oscillator 20, and controls the operation of the manipulator 14 as well as the supply of the laser beam from the laser oscillator 20 through the optical fiber 22 to the laser processing tool 18, so as to carry out a desired laser processing on a workpiece W. The optical fiber 22 is usually contained in an outer sheath to constitute a cable or, in some cases, be laid in such a state as to be contained in a conduit together with pipelines for an assist gas or cooling water, sensor control cables, and so on.

FIGS. 2A and 2B show one embodiment of the laser processing robot 10 having the above-described basic configuration. In the illustrated embodiment, the manipulator 14 has a structure of a five-axes vertical articulated manipulator, and includes an arm section (so-called a forearm) 28 having a wrist portion 26. The manipulator 14 further includes a stationary base 30, and a second arm section (so-called an upper arm) 34 connected through a first joint section 32 to the stationary base 30, with the arm section 28 connected through a second joint section 36 to the second arm section 34. The first joint section 32 connects the second arm section 34 to the stationary base 30 in a manner rotatable about a vertical axis (or a control axis) 38 and pivotable about a horizontal axis (or a control axis) 40. The second joint section 36 connects the arm section 28 to the second arm section 34 in a manner pivotable about a second horizontal axis (or a control axis) 42 and rotatable about a second vertical axis (or a control axis) 44. Further, the laser processing tool 18 is joined to the wrist portion 26 of the arm section 28 in a manner pivotable about a third horizontal axis (or a control axis) 46. In the present application, a rotational control axis of the arm section 28, of which the rotation center is the second vertical axis 44, is referred to as a first control axis 44, and a pivotal control axis of the laser processing tool 18, of which the rotation center is the third horizontal axis 46, is referred to as a second control axis 46 perpendicular to the first control axis 44.

Figure 3:
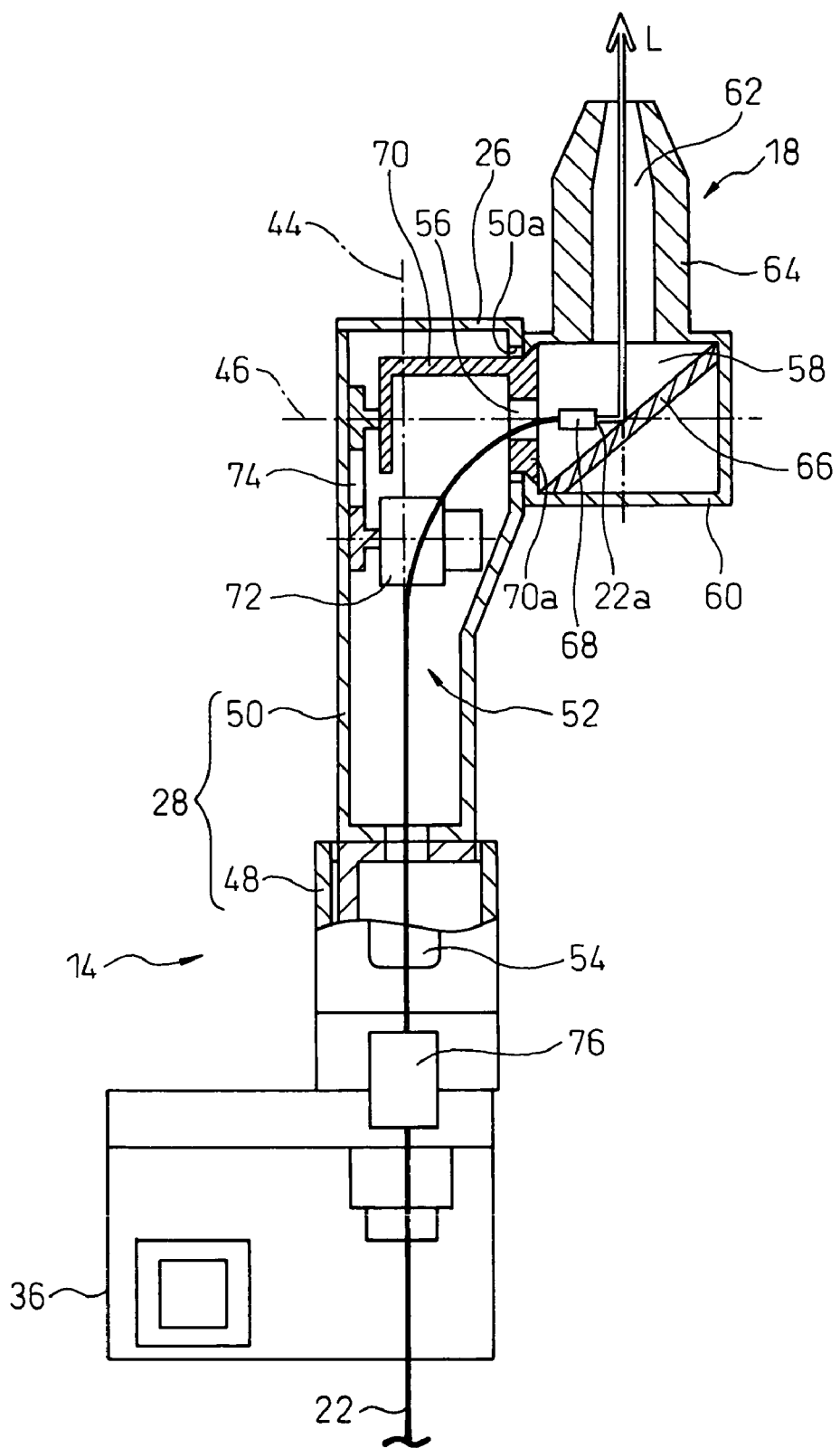
FIG. 3 is a partially cutaway enlarged view showing the arm section of a manipulator and a laser processing tool, provided in the laser processing robot of FIG. 2A.

More specifically, referring to FIG. 3, the arm section 28 includes a first member 48 attached to the second joint section 36 and disposed fixedly relative to the first control axis 44 at a side opposite to the wrist portion 26, and a second member 50 supported on the first member 48 and rotatable about the first control axis 44, the second member 50 provided at the distal end thereof with the wrist portion 26. Each of the first member 48 and the second member 50 is a hollow tubular member, and a line passage 52 is formed continuously inside the first member 48 and the second member 50. An optical fiber inlet port 54 for introducing the optical fiber 22 into the line passage 52 is provided in the first member 48 of the arm section 28, so as to open at a lateral side opposite to the second arm section 34 with respect to the second joint section 36 (FIG. 2B). An optical fiber outlet port 56 for drawing out the optical fiber 22 from the line passage 52 is provided in the wrist portion 26 of the second member 50 of the arm section 28, so as to open along the axial line of the second control axis 46.

The laser processing tool 18 includes an attachment section 60 adapted to be attached to the wrist portion 26 of the arm section 28 and pivotable about the second control axis 46, the attachment section including a cavity 58 communicating with the optical fiber outlet port 56 of the line passage 52; a nozzle section 64 extending integrally from the attachment section 60 and provided with a laser beam passage 62 extending in a direction intersecting the axial line of the second control axis; and a reflecting section 66 fixedly arranged inside the cavity 58 of the attachment section 60 for reflecting a laser beam L emitted from the optical fiber 22 and directing the laser beam to the laser beam passage 62. The optical fiber 22 is disposed inside the line passage 52 in a suitably bent form (i.e., with a bending radius not smaller than the minimum-allowable bending radius) in a manner that the emitting end face 22a of the optical fiber 22 is positioned between the optical fiber outlet port 56 provided in the wrist portion 26 and the reflecting section 66 of the laser processing tool 18. The distal end region, including the emitting end face 22a, of the optical fiber 22 may be advantageously supported in a fixed manner relative to the wrist portion 26 by a not-shown means and through, for example, a block member 68.

According to the laser processing robot 10 having the configuration as described above, the optical fiber 22 accommodated in the line passage 52 of the wrist portion 28 can maintain a preset suitable bent form (i.e., with a bending radius not smaller than the minimum-allowable bending radius) in the line passage 52 without being substantially affected by the pivoting motion of the laser processing tool 18 attached to the wrist portion 26. The optical fiber 22 is also held within the line passage 52 continuously formed in the first and second members 48, 50 of the arm section 28.

Therefore, in a laser processing operation, it is possible to reliably prevent the optical fiber 22 from being excessively entangled or bent, which may lead to the damage of the fiber or the lowering of the laser beam power, during a period when the orientation of the manipulator 14 is variously changed to direct the nozzle section 64 of the laser processing tool 18 into a suitable welding orientation relative to the workpiece W (FIG. 1). Further, the laser beam L emitted from the optical fiber 22 is reflected by the reflecting section 66 provided in the laser processing tool 18 in a direction intersecting the axial line of the second control axis 46 and is discharged from the nozzle section 64 toward the workpiece W to be irradiated (FIG. 1), so that it is possible to reduce the projecting length of the nozzle section 64 relative to the wrist portion 26 in a direction along the second control axis 46, and thus to effectively suppress an increase in dimensions of the end effector region of the laser processing robot 10.

In the laser processing robot 10, as shown in FIG. 3, it is advantageous that the emitting end face 22a of the optical fiber 22 is positioned on the axial line of the second control axis 46, and that the optical axis of the laser beam L emitted from the emitting end face 22a coincides with the axial line of the second control axis 46, at a location just before the reflecting section 66 of the laser processing tool 18. According to this arrangement, during a period when the laser processing tool 18 operates to pivot about the second control axis 46, the optical axis of the laser beam L reflected by the reflecting section 66 is maintained at the same position in the laser beam passage 62 of the nozzle section 64, irrespective of a pivoting angle, so that it is possible to facilitate the control of the manipulator 14 in the laser processing operation.

It is also advantageous that, as illustrated, the reflecting section 66 of the laser processing tool 18 is constructed to define, within the laser beam passage 62 of the nozzle section 64, the optical axis of the reflected laser beam L to be generally perpendicular to the axial line of the second control axis 46, at a position spaced from the axial line of the first control axis 44. According to this arrangement, it is possible to minimize the projecting length of the nozzle section 64 from the wrist portion 28 in a direction along the second control axis 46.

As shown in FIG. 3, in the laser processing robot 10, a coupler shaft member 70, having a U-shaped cross-section, is provided in the wrist portion 26 of the arm section 28. The coupler shaft member 70 is one element provided at the output-end side of a power transmission mechanism in the drive mechanism of the second control axis 46, and is connected through a belt/pulley unit 74 as the power transmission mechanism to an electric motor 72 as the drive source of the drive mechanism. The drive mechanism of the second control axis 46 (i.e., the coupler shaft member 70, the electric motor 72 and the belt/pulley unit 74) is housed in the interior of the second member 50 of the arm section 28 at the wrist portion 26. The coupler shaft member 70 has a flange 70a exposed to the outside of a lateral opening 50a formed in the second member 50 at the wrist portion 26. The optical fiber outlet port 56 is formed in the flange 70a, and the attachment section 60 of the laser processing tool 18 is fixed to the flange 70a. Thereby, the laser processing tool 18 operates for pivot motion, integrally with the coupler shaft member 70, about the second control axis 46 by the output power of the electric motor 72.

Thus, the drive mechanism of the second control axis 46 (especially, the electric motor 72) is arranged inside the second member 50 of the arm section 28, so that it is possible to effectively eliminate a projecting portion on the outer surface at the wrist portion 26, and thus to more easily perform the laser processing operation in a narrow space. The U-shaped cross-section of the coupler shaft member 70 functions so as to effectively prevent interference between the coupler shaft member 70 and the optical fiber 22, during the pivoting motion of the laser processing tool 18. In particular, as illustrated, when the electric motor 72 is disposed side by side with the coupler shaft member 70 (i.e., the output-side element of the power transmission mechanism) in the interior of the second member 50, and the center (or rotation) axes thereof are disposed parallel to each other, it is possible to ensure an ample space to permit the optical fiber 22 to be displaced freely in the interior of the second member 50, during the operation of the manipulator 14 (and especially during the rotation of the arm section 28 about the first control axis 44).

In the laser processing robot 10, it is advantageous that a holder 76 for holding the optical fiber 22 is fixedly provided on the outer surface of the second joint section 36, near the optical fiber inlet port 54 provided in the first member 48 of the arm section 28. According to this structure, it is possible to suppress the displacement motion of the optical fiber 22 during the operation of the manipulator 14.

It should be noted that, for example, in place of the arrangement of the illustrated embodiment, in which the optical fiber inlet port 54 is formed at the lateral side of the first member 48 of the arm section 28, a through-hole may be formed in the second joint section 36 and the axial end face of the first member 48 adjacent thereto, so as to be used as an optical fiber inlet port. Also, in place of the five-axes vertical articulated manipulator 14 adopted in the illustrated embodiment, manipulators having various other constructions may be adopted.

As will be clearly understood from the above description, the laser processing robot and the robot system including the same, according to the present invention, can avoid, with a low-cost structure, the excessive entanglement or bending of the optical fiber for transmitting a laser beam and, therefore, can be advantageously utilized as a safe and easily operable industrial robot that is capable of preventing the interference between the optical fiber and the peripheral devices for the robot.

While the invention has been described with reference to specific preferred embodiments, it will be understood by those skilled in the art that various changes and modifications may be made thereto without departing from the scope of the following claims.

The invention claimed is:
1. A laser processing robot comprising:
   a manipulator including an arm section having a wrist portion, said manipulator provided with a plurality of control axes;
   a laser processing tool attached to said wrist portion of said manipulator;
   an optical fiber for transmitting a laser beam toward said laser processing tool; and
   a line passage formed inside said arm section of said manipulator and accommodating said optical fiber;
   wherein said arm section includes:
      a first member disposed fixedly relative to a first control axis at a side opposite to said wrist portion; and
      a second member supported on said first member and rotatable about said first control axis, said second member provided at a distal end thereof with said wrist portion;

said line passage being formed continuously within said first member and said second member, an optical fiber inlet port of said line passage being provided in said first member and an optical fiber outlet port of said line passage being provided in said wrist portion of said second member;

wherein said laser processing tool includes:
an attachment section adapted to be attached to said wrist portion and rotatable about a second control axis perpendicular to said first control axis;
a nozzle section extending from said attachment section and provided with a laser beam passage extending in a direction intersecting an axial line of said second control axis; and
a reflecting section arranged within said attachment section for reflecting a laser beam emitted from said optical fiber and directing the laser beam toward said laser beam passage; and wherein an emitting end face of said optical fiber is positioned between said optical fiber outlet port provided in said wrist portion and said reflecting section of said laser processing tool.

2. A laser processing robot according to claim 1, wherein said emitting end face of said optical fiber is positioned on said axial line of said second control axis; and wherein an optical axis of said laser beam emitted from said emitting end face coincides with said axial line of said second control axis.

3. A laser processing robot according to claim 1, wherein said reflecting section of said laser processing tool defines, within said laser beam passage of said nozzle section, an optical axis of said laser beam, generally perpendicular to said axial line of said second control axis, at a position spaced from an axial line of said first control axis.

4. A laser processing robot according to claim 1, further comprising an electric motor for pivoting said laser processing tool about said second control axis, said electric motor being housed in an interior of said second member of said arm section.

5. A laser processing robot according to claim 4, further comprising a power transmission mechanism for transmitting an output power of said electric motor to said attachment section of said laser processing tool, said electric motor being disposed in said interior of said second member and side by side with an output-side element of said power transmission mechanism.

6. A laser processing robot according to claim 1, wherein said manipulator comprises a five-axes vertical articulated manipulator.

7. A robot system comprising a laser processing robot according to claim 1 and a laser oscillator connected to said optical fiber of said laser processing robot.

* * * * *